United States Patent
Semper

(10) Patent No.: US 7,047,010 B2
(45) Date of Patent: May 16, 2006

(54) SYSTEM AND METHOD FOR PROVIDING RESCUE CHANNEL COMMUNICATIONS BETWEEN BASE STATIONS IN A WIRELESS COMMUNICATION SYSTEM

(75) Inventor: William Joseph Semper, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 592 days.

(21) Appl. No.: 10/028,390

(22) Filed: Dec. 21, 2001

(65) Prior Publication Data

US 2003/0119507 A1 Jun. 26, 2003

(51) Int. Cl.
*H04Q 7/20* (2006.01)

(52) U.S. Cl. ............. 455/439; 455/436; 455/438; 370/331; 370/332

(58) Field of Classification Search ............. 455/436, 455/437, 438, 439, 443, 444; 370/335, 336, 370/342, 331, 329, 332
See application file for complete search history.

(56) References Cited

U.S. PATENT DOCUMENTS

| | | | |
|---|---|---|---|
| 6,725,043 B1 * | 4/2004 | Bonta et al. | 455/437 |
| 2001/0055969 A1 * | 12/2001 | Bonta et al. | 455/436 |
| 2002/0058528 A1 * | 5/2002 | Hunzinger | 455/550 |
| 2002/0068569 A1 * | 6/2002 | Chen et al. | 455/437 |
| 2002/0072357 A1 * | 6/2002 | Matsuda | 455/422 |
| 2002/0077104 A1 * | 6/2002 | Chen et al. | 455/436 |
| 2002/0090965 A1 * | 7/2002 | Chen et al. | 455/522 |
| 2002/0119787 A1 * | 8/2002 | Hunzinger | 455/455 |

* cited by examiner

*Primary Examiner*—Danh Cong Le

(57) ABSTRACT

A system and method is disclosed for providing rescue channel communications between base stations in a wireless communication system. The invention comprises a source base station that is capable of sending messages to a rescue base station to cause the rescue base station to establish a rescue channel for a mobile station that has lost its traffic channel. The messages for establishing rescue channels communications between the base stations comprise Internetwork Operating System (IOS) messages that have been modified to add rescue channel indicator information. In an alternate advantageous embodiment of the invention, specially designed rescue channel activation messages and rescue channel activation acknowledgment messages are used to establish a rescue channel for the mobile station.

28 Claims, 14 Drawing Sheets

| 7 | 6 | 5 | 4 | 3 | 2 | 1 | 0 | OCTET |
|---|---|---|---|---|---|---|---|---|
| PHYSICAL CHANNEL INFO: A3 / A7 ELEMENT IDENTIFIER = [07H] ||||||||  1 |
| LENGTH = [06H] |||||||| 2 |
| RESERVED = [0000] |||| FRAME OFFSET = [0H - FH] |||| 3 |
| A3 TRAFFIC CHANNEL PROTOCOL STACK = [001] ||| PILOT GATING RATE = [00, 01, 10] || ARFCN (HIGH PART) = [000 - 111] ||| 4 |
| ARFCN (LOW PART) = [00H - FFH] |||||||| 5 |
| COUNT OF PHYSICAL CHANNELS = [01H - 04H] |||||||| 6 |
| RESERVED = [0000] |||| OTD = [0, 1] | COUNT OF PHYSICAL CHANNELS = [001 - 100] ||| 7 |
| PHYSICAL CHANNEL 2 = 0H - N/A 1H - FCH 2H - SCH_0 3H - DCCH |||| PHYSICAL CHANNEL 1 = 0H - IS-95 1H - FCH 2H - SCH_0 3H - DCCH 4H - RESCUE CHANNEL |||| 8 |
| PHYSICAL CHANNEL 4 = 0H - N/A 1H - FCH 2H - SCH_0 3H - DCCH 4H - SCH_1 |||| PHYSICAL CHANNEL 3 = 0H - N/A 1H - FCH 2H - SCH_0 3H - DCCH 4H - SCH_1 |||| 9 |

FIG. 6

| 7 | 6 | 5 | 4 | 3 | 2 | 1 | 0 | OCTET |
|---|---|---|---|---|---|---|---|---|
| A3 CONNECT INFORMATION: A3 / A7 ELEMENT IDENTIFIER = [1BH] ||||||||  1 |
| LENGTH = [ <VARIABLE> ] |||||||| 2 |
| RESERVED = [000] ||| PHYSICAL CHANNEL TYPE =<br>0H - FUNDAMENTAL CHANNEL (IS-95)<br>1H = FUNDAMENTAL CHANNEL (FCH)<br>2H - SUPPLEMENTAL CHANNEL (SCH_0)<br>3H - DEDICATED CONTROL CHANNEL (DCCH)<br>4H - SUPPLEMENTAL CHANNEL (SCH_1)<br>5H - RESCUE CHANNEL |||| NEW A3 INDICATOR = [0, 1] (EXIST, NEW) | 3 |

FIG. 7

| INFORMATION ELEMENT | SECTION REFERENCE | ELEMENT DIRECTION | TYPE | | |
|---|---|---|---|---|---|
| MESSAGE TYPE II | 6.2.2.5 | SDU → BTS | M | | |
| CALL CONNECTION REFERENCE | 6.2.2.98 | SDU → BTS | | O | R |
| CDMA LONG CODE TRANSITION INFO | 6.2.2.128 | SDU → BTS | | O | C |
| CHANNEL ELEMENT ID | 6.2.2.132 | SDU → BTS | | O | C |
| PRIVACY INFO | 6.2.2.143 | SDU → BTS | | O | C |
| A3 TRAFFIC CIRCUIT ID | 6.2.2.96 | SDU → BTS | | O | C |
| REVERSE PILOT GATING RATE | 6.2.2.33 | SDU → BTS | | O | C |
| IS-2000 FORWARD POWER CONTROL MODE | 6.2.2.177 | SDU → BTS | | O | C |
| IS-2000 MOBILE PILOT GAIN | 6.2.2.180 | SDU → BTS | | O | C |
| A3 DESTINATION ID | 6.2.2.175 | SDU → BTS | | O | C |
| RESCUE CHANNEL INDICATOR (RCI) | 6.2.2.xxx | SDU → BTS | | O | C |

FIG. 8

| 7 | 6 | 5 | 4 | 3 | 2 | 1 | 0 | OCTET |
|---|---|---|---|---|---|---|---|---|
| RESCUE CHANNEL INDICATOR: A3 / A7 ELEMENT IDENTIFIER = [xxH] | | | | | | | | 1 |
| RESERVED = [0000 000] | | | | | | | RCI = 1 | 2 |

FIG. 9

| INFORMATION ELEMENT | SECTION REFERENCE | ELEMENT DIRECTION | TYPE | |
|---|---|---|---|---|
| MESSAGE TYPE II | 6.2.2.5 | SDU → BTS | M | |
| CALL CONNECTION REFERENCE | 6.2.2.98 | SDU → BTS | O | R |
| RESCUE CHANNEL INDICATOR | 6.2.2.xxx | SDU → BTS | O | R |
| A3 DESTINATION ID | 6.2.2.175 | SDU → BTS | O | C |

FIG. 11

| VALUE (HEX) | PHYSICAL CHANNEL TYPE |
|---|---|
| 0H | IS-95 FUNDAMENTAL CHANNEL TIA / EIA / IS-95 |
| 1H | FUNDAMENTAL CHANNEL (FCH) TIA / EIA / IS-2000 |
| 2H | SUPPLEMENTAL CHANNEL (SCH_0) TIA / EIA / IS-2000 |
| 3H | DEDICATED CONTROL CHANNEL (DCCH) TIA / EIA / IS-2000 |
| 4H | SUPPLEMENTAL CHANNEL (SCH_1) TIA / EIA / IS-2000 |
| 5H | RESCUE CHANNEL (RC) TIA / EIA / IS-2000-B |
| ALL OTHER VALUES | RESERVED |

FIG. 10

| 7 | 6 | 5 | 4 | 3 | 2 | 1 | 0 | OCTET |
|---|---|---|---|---|---|---|---|---|
| MESSAGE TYPE I I = [xxH] | | | | | | | | 1 |
| CALL CONNECTION REFERENCE: A1 ELEMENT IDENTIFIER = [3FH] | | | | | | | | 1 |
| LENGTH = [08H] | | | | | | | | 2 |
| (MSB) | | | | MARKET ID = [ < ANY VALUE > ] | | | | 3 |
| | | | | | | | (LSB) | 4 |
| (MSB) | | | | GENERATING ENTITY ID = [ < ANY VALUE > ] | | | | 5 |
| | | | | | | | | 6 |
| | | | | | | | (LSB) | 7 |
| (MSB) | | | | CALL CONNECTION REFERENCE = [ < ANY VALUE > ] | | | | 8 |
| | | | | | | | | 9 |
| | | | | | | | (LSB) | 10 |
| RESCUE CHANNEL INDICATOR: A3 / A7 ELEMENT IDENTIFIER = [xxH] | | | | | | | RCI | 1 |
| RESERVED = [0000 000] | | | | | | | | 2 |
| A3 DESTINATION ID: A3 / A7 ELEMENT IDENTIFIER = [55H] | | | | | | | | 1 |
| LENGTH OF A3 DESTINATION ID = [01H - 08H] | | | | | | | | 2 |
| (LSB) | | | | A3 DESTINATION ID = [ < ANY VALUE > ] | | | | 3 |
| | | | | | | | | ... |
| | | | | | | | (LSB) | K |

FIG. 12

| INFORMATION ELEMENT | SECTION REFERENCE | ELEMENT DIRECTION | TYPE | |
|---|---|---|---|---|
| MESSAGE TYPE II | 6.2.2.5 | BTS → SDU | M | |
| CALL CONNECTION REFERENCE | 6.2.2.98 | BTS → SDU | O | R |
| PMC CAUSE | 6.2.2.99 | BTS → SDU | O | C |
| A3 DESTINATION ID | 6.2.2.175 | BTS → SDU | O | C |
| A7 DESTINATION ID | 6.2.2.173 | BTS → SDU | O | C |

FIG. 13

| 7 | 6 | 5 | 4 | 3 | 2 | 1 | 0 | OCTET |
|---|---|---|---|---|---|---|---|---|
| MESSAGE TYPE II = [xxH] | | | | | | | | 1 |
| CALL CONNECTION REFERENCE: A1 ELEMENT IDENTIFIER = [3FH] | | | | | | | | 1 |
| LENGTH = [08H] | | | | | | | | 2 |
| (MSB) | | | | | | | | 3 |
| MARKET ID = [ < ANY VALUE > ] | | | | | | | | |
| | | | | | | | (LSB) | 4 |
| (MSB) | | | | | | | | 5 |
| GENERATING ENTITY ID = [ < ANY VALUE > ] | | | | | | | | 6 |
| | | | | | | | (LSB) | 7 |
| (MSB) | | | | | | | | 8 |
| CALL CONNECTION REFERENCE = [ < ANY VALUE > ] | | | | | | | | 9 |
| | | | | | | | (LSB) | 10 |
| PMC CAUSE: A3 / A7 ELEMENT IDENTIFIER = [05H] | | | | | | | | 1 |
| LENGTH = [01H] | | | | | | | | 2 |
| PMC CAUSE VALUE = [0AH (RESOURCE NOT AVAILABLE)] | | | | | | | | 3 |
| A3 DESTINATION ID: A3 / A7 ELEMENT IDENTIFIER = [55H] | | | | | | | | 1 |
| LENGTH OF A3 DESTINATION ID = [01H - 08H] | | | | | | | | 2 |
| (MSB) | | | | | | | | 3 |
| A3 DESTINATION ID = [ < ANY VALUE > ] | | | | | | | | ... |
| | | | | | | | (LSB) | K |
| A3 DESTINATION ID: A3 / A7 ELEMENT IDENTIFIER = [2DH] | | | | | | | | 1 |
| LENGTH OF A7 DESTINATION ID = [01H - 08H] | | | | | | | | 2 |
| (MSB) | | | | | | | | 3 |
| A7 DESTINATION ID = [ < ANY VALUE > ] | | | | | | | | ... |
| | | | | | | | (LSB) | K |

FIG. 14

SYSTEM AND METHOD FOR PROVIDING RESCUE CHANNEL COMMUNICATIONS BETWEEN BASE STATIONS IN A WIRELESS COMMUNICATION SYSTEM

TECHNICAL FIELD OF THE INVENTION

The present invention is directed, in general, to wireless communication systems and devices and, more specifically, to a system and method for providing rescue channel communications between base stations in a wireless communication system.

BACKGROUND OF THE INVENTION

Wireless communication systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations and other access terminals (e.g., pagers, cell phones, laptop PCs with wireless modems) and base stations transmit and receive data on the same frequency in assigned channels that correspond to specific unique orthogonal codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, modulated by a 64-ary orthogonal modulation, and spread prior to transmission by the mobile station. The data symbols following interleaving may be separated into an in-phase (I) data stream and a quadrature (Q) data stream for QPSK modulation of an RF carrier. One such implementation is found in the TIA/EIA-95 CDMA standard (also known as IS-95). Another implementation is the TIA/EIA-2000 standard (also known as IS-2000).

The current generation of cellular phones is used primarily for voice conversations between a subscriber device (or wireless device) and another party through the wireless network. A smaller number of wireless devices are data devices, such as personal digital assistants (PDAs) equipped with cellular/wireless modems. Because the bandwidth for a current generation wireless device is typically limited to a few tens of kilobits per second (kbps), the applications for the current generation of wireless devices are relatively limited. However, this is expected to change in the next (or third) generation of cellular/wireless technology, sometimes referred to as "3G" cellular/wireless, where much greater bandwidth will be available to each wireless device (i.e., one hundred twenty five thousand bits per second (125 kbps) or greater). The higher data rates will make Internet applications for wireless devices much more common. For instance, a 3G cellular telephone (or a PC with a 3G cellular modem) may be used to browse web sites on the Internet, to transmit and receive graphics, to execute streaming audio or video applications, and the like. A much higher percentage of the wireless traffic handled by 3G cellular systems will be Internet protocol (IP) traffic and a lesser percentage will be traditional voice traffic.

Real-time streaming of multimedia content over Internet protocol (IP) networks has become an increasingly common application in recent years. As noted above, 3G wireless networks will provide streaming data (both video and audio) to wireless devices for real time applications. A wide range of interactive and non-interactive multimedia Internet applications, such as news on-demand, live TV viewing, video conferencing, live radio broadcasting (such as Broadcast.com), and the like, will provide "real time" data streaming to wireless devices. Unlike a "downloaded" video file, which may be retrieved first in "non-real" time and viewed or played back later, real time (or streaming) data applications require a data source to encode and to transmit a streaming data signal over a network to a receiver, which must decode and play the signal (video or audio) in real time.

The CDMA 2000 Air Interface Standard provides a rescue channel for the "rescue" of a mobile station that has lost it traffic channel. The term "rescue" refers to the re-establishment of communications between the mobile station and a base station on a rescue channel. To understand the operation of the rescue channel, consider a mobile station (MS) that is communicating with a base station controller (BSC) on an active call. During the active call the mobile station sends a Pilot Strength Measurement Message (PSMM) to the base station controller. The PSMM indicates to the base station controller the identity of local base stations that are near the mobile station (referred to as "neighbor" base stations). The mobile station keeps a neighbor list identifying the neighbor base stations.

If a neighbor base station is capable of providing a rescue channel for the mobile station, the base station controller notifies the mobile station by sending the mobile station an extended neighbor list update message. The extended neighbor list update message sends to the mobile station (1) the rescue channel Walsh codes, and (2) the Quasi-Orthogonal function for the neighbor base station. These codes are specially reserved codes on the neighbor base station. These codes are used only in case a rescue is attempted. In this manner a rescue channel is reserved for the use of the mobile station.

If during an active call the mobile station receives two or more bad frames, the mobile station will shut down its transmitter and wait until communication conditions improve. The time during which communications are interrupted is referred to as a "fade" period. After the communication conditions have improved, the mobile station sends an Extended Pilot Strength Measurement Message (Extended PSMM) to the base station controller. During the "fade" period if the mobile station notices that the pilot signal of a neighbor base station in the neighbor list has grown in strength, the mobile station may automatically promote that pilot signal into its active set. The promotion of the neighbor base station is communicated from the mobile station to the base station controller in the Extended PSMM. The Extended PSMM indicates to the base station controller that the mobile station would like to attempt a rescue on the promoted neighbor base station.

The promoted neighbor base station (now the "rescue" base station) begins transmitting on the previously reserved rescue channel. At the same time the rescue base station is listening for the mobile station on the mobile station's reverse traffic channel. When the rescue base station acquires the mobile station, a regular handoff may be initiated in order to move the mobile station of the rescue channel.

The presently existing rescue channel feature in the CDMA 2000 Air Interface Standard does not provide for rescue channel communications between base stations in a wireless communication system. Therefore, there is a need in the art for a system and method that is capable of providing rescue channel communications between base stations in a wireless communication system. In particular, there is a need for a system and method that is capable of providing rescue channel messages in a proper format to enable base stations in a wireless communications system to coordinate and carry out rescues of mobile station communications using the rescue channel feature.

SUMMARY OF THE INVENTION

It is an object of the present invention to provide a system and method that is capable of providing rescue channel communications between base stations in a wireless network system.

The system and method of the invention comprises a source base station and a rescue base station. The source base station is capable of sending messages to the rescue base station to cause the rescue base station to establish a rescue channel for a mobile station that has lost its traffic channel. The messages for establishing rescue channels communications between the source base station and the rescue base station comprise Internetwork Operating System (IOS) messages that have been modified to add rescue channel indicator information. In an alternate advantageous embodiment of the invention, specially designed rescue channel activation messages and rescue channel activation acknowledgment messages are is used to establish a rescue channel for the mobile station.

The base station controller of the source base station and the base station controller of rescue base station each comprise an A3/A7 message controller and a rescue channel controller. The A3/A7 controller prepares A3 messages and A7 messages for transmission to another base station. A3/A7 message controller also interprets incoming A3 messages and A7 messages received from a mobile station or from another base station. The rescue channel controller coordinates the establishment of a rescue channel by a rescue base station for a mobile station that has lost its traffic channel.

It is an object of the present invention to provide a rescue base station that is capable of providing a rescue channel for a mobile station and to provide a source base station that is capable of sending messages to the rescue base station to establish a rescue channel from the source base station to the mobile station through the rescue base station.

It is also an object of the present invention to provide a source base station that is capable of sending an A7 handoff request message to a rescue base station to establish a rescue channel for a mobile station.

It is another object of the present invention to provide an A7 handoff request message that comprises an A7 handoff request message of a CDMA 2000 Air Interface Standard that has been modified to include a rescue channel indicator.

It is yet another object of the present invention to provide an A3 connect message that comprises an A3 connect message of a CDMA 2000 Air Interface Standard that has been modified to include a rescue channel indicator.

It is an additional object of the present invention to provide an A3 physical transition directive message that comprises an A3 physical transition directive message of a CDMA 2000 Air Interface Standard modified to include a rescue channel indicator.

It is also an object of the present invention to provide an A3 rescue channel activation message to be sent from a source base station to a rescue base station indicating that a rescue attempt is in progress.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 6 illustrates an exemplary bitmap layout for an A7 handoff request message that supports the rescue channel feature of the present invention;

FIG. 7 illustrates an exemplary bitmap layout for an A3 connect message that supports the rescue channel feature of the present invention;

FIG. 8 illustrates a chart of information elements that may be sent using an A3 physical transition directive message showing a rescue channel indicator of the present invention;

FIG. 9 illustrates an exemplary bitmap layout of a rescue channel activation request to be added to an A3 physical transition directive message in accordance with the principles of the present invention;

FIG. 10 illustrate a chart of physical channel types showing the rescue channel of the present invention;

FIG. 11 illustrates a chart of information elements that may be sent using an A3 rescue channel activation message showing a rescue channel indicator of the present invention;

FIG. 12 illustrates an exemplary bitmap layout of an A3 rescue channel activation message of the present invention;

FIG. 13 illustrates a chart of information elements that may be sent using an A3 rescue channel activation acknowledgment message of the present invention;

FIG. 14 illustrates an exemplary bitmap layout of an A3 rescue channel activation acknowledgment message of the present invention;

DETAILED DESCRIPTION OF THE INVENTION

FIGS. 1 through 16, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile communications network.

Figure 1:
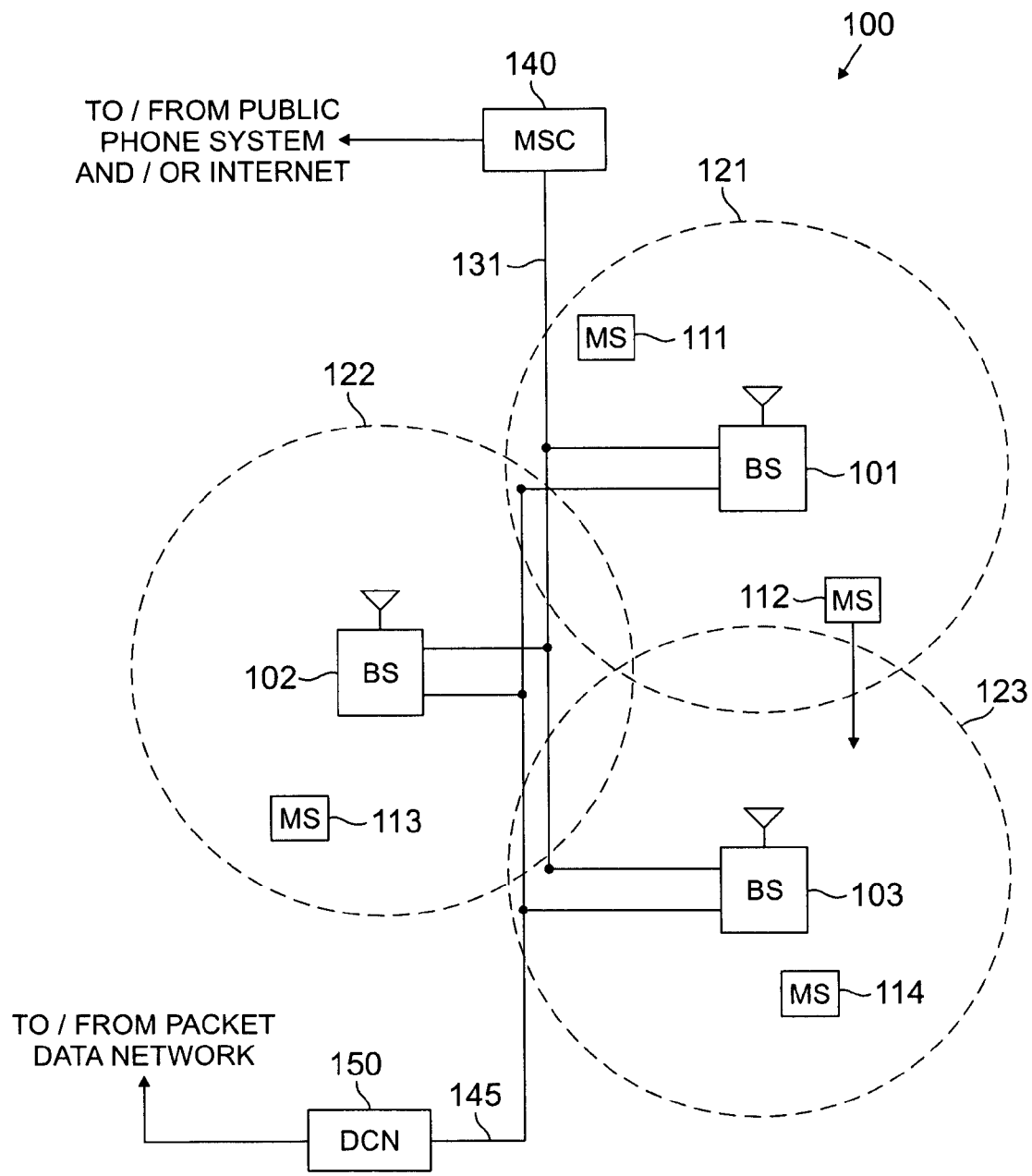
FIG. 1 illustrates an exemplary prior art wireless network.

FIG. 1 illustrates an exemplary prior art wireless network 100. Wireless network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like, which are capable of communicating with the base stations via wireless links.

Other types of access terminals, including fixed access terminals, also may be present in wireless network 100. However, for the sake of simplicity, only mobile stations are shown.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

Each of the base stations BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 links each vocoder in the base station controller (BSC) with switch elements in the mobile switching center (MSC) 140. In one advantageous embodiment, each link provides a digital path for transmission of voice signals in the pulse code modulated (PCM) format. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

BS 101, BS 102 and BS 103 transfer data signals between each other and the Internet or other packet data network (not shown) via communications line 145 and data core network (DCN) server 150. Data core network (DCN) server 150 is well known to those skilled in the art. Data core network (DCN) server 150 is a packet data switching or routing device that provides services and coordination between the subscribers in a wireless network and external packet data networks, such as a corporate Ethernet system and/or the Internet. Those skilled in the art will understand that line 145 interfaces to a packet data serving node (not shown) located in data core network 150. Communications line 145 may be any suitable connection line, including an Ethernet link, a T1 connection, a T3 line, a fiber optic link, a network backbone connection, and the like. In some embodiments, communications line 145 may comprise several different data links, where each data link couples one of BS 101, BS 102, or BS 103 to data core network (DCN) 150.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a handoff will occur.

As is well known to those skilled in the art, the handoff procedure transfers control of a call from a first cell to a second cell. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

For example, assume that mobile stations 111–114 communicate with base stations BS 101, BS 102 and BS 103 over code division multiple access (CDMA) channels. As MS 112 moves from cell 121 to cell 123, MS 112 determines that a handoff is required based on detection of a control signal from BS 103, increased bit error rate on signals from BS 101, signal time delay, or some other characteristic. When the strength of the control signal transmitted by BS 103, or the bit error rate of signals received from BS 101, or the round trip time delay exceeds a threshold, BS 101 initiates a handoff process by signaling MS 112 and the target BS 103 that a handoff is required. BS 103 and MS 112 proceed to negotiate establishment of a communications link. The call is thereby transferred from BS 101 to BS 103. An idle handoff is a handoff between cells of a mobile device that is communicating in the control or paging channel, rather than transmitting voice and/or data signals in the regular traffic channels.

One or more of the wireless devices in wireless network 100 may be capable of executing real time applications, such as streaming audio or streaming video applications. Wireless network 100 receives the real time data from, for example, the Internet through data core network (DCN) server 150 and through communications line 145 and transmits the real time data in the forward channel to the wireless device. For example, MS 112 may comprise a 3G cellular phone device that is capable of surfing the Internet and listening to streaming audio, such as music from the web site "www.mp3.com" or a sports radio broadcast from the web site "www.broadcast.com." MS 112 may also view streaming video from a news web site, such as "www.CNN.com." To avoid increasing the memory requirements and the size of wireless phone devices, one or more of the base stations in wireless network 100 provides real time data buffers that can be used to buffer real time data being sent to, for example, MS 112.

Figure 2:
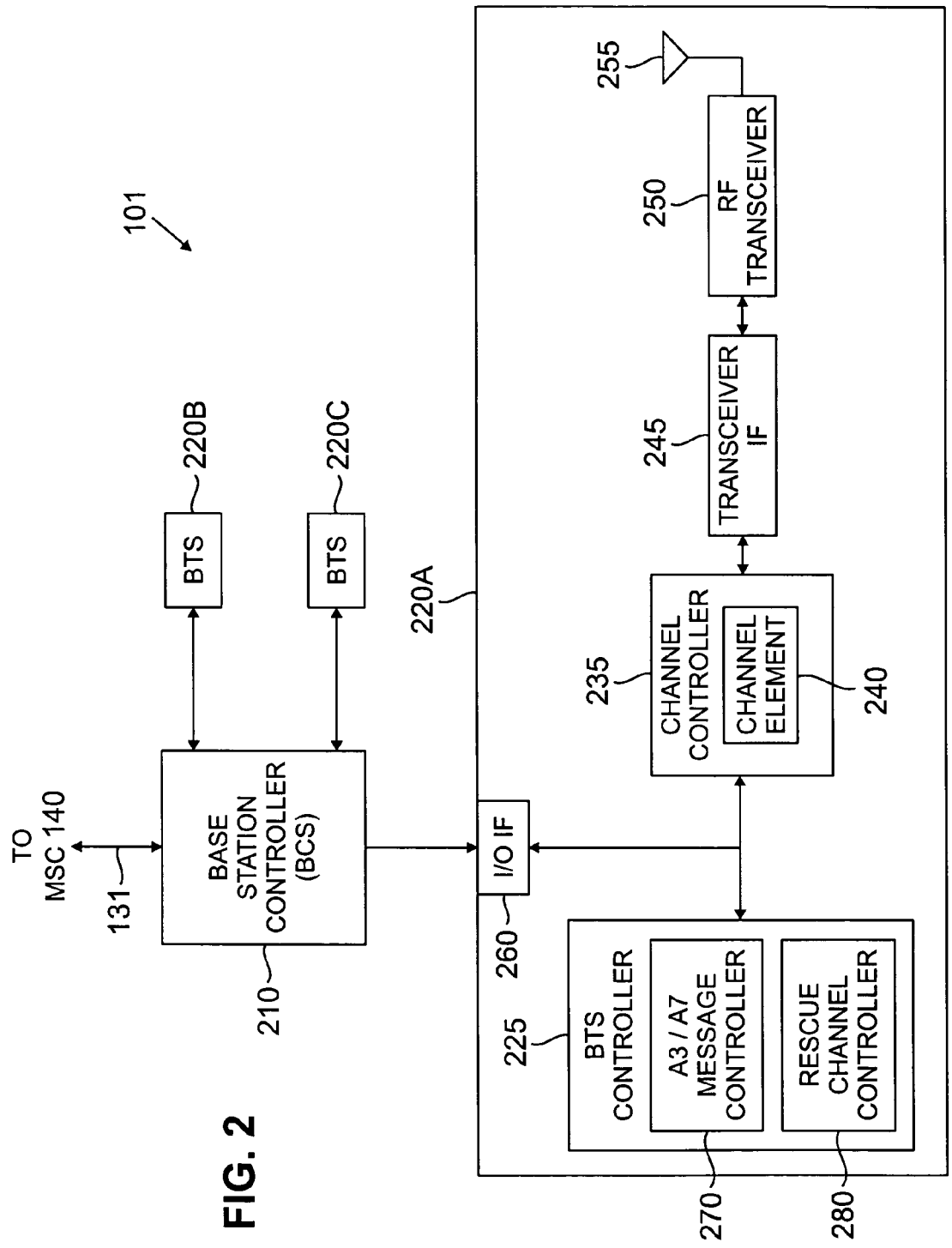
FIG. 2 illustrates an exemplary base station according to an advantageous embodiment of the present invention.

FIG. 2 illustrates exemplary base station 101 and base transceiver station (BTS) 220A according to an advantageous embodiment of the present invention. Base station 101 comprises base station controller (BSC) 210 and base transceiver stations BTS 220A, BTS 220B, and BTS 220C. Base station controllers and base transceiver stations were described previously in connection with FIG. 1.

BSC 210 manages the resources in cell site 121, including BTS 220A, BTS 220B, and BTS 220C. As described above, BSC 210 is coupled to MSC 140 over data communication line 131. Exemplary BTS 220A comprises BTS controller 225, channel controller 235 that contains exemplary channel element 240, transceiver interface (IF) 245, RF transceiver unit 250, and antenna array 255. Input/output interface (I/O IF) 260 couples BTS 220A to BSC 210.

BTS controller 225 controls the overall operation of BTS 220A and interfaces with BSC 210 through I/O IF 260. BTS controller 225 directs the operation of channel controller 235. Channel controller 235 contains a number of channel elements such as is channel element 240. The channel elements perform bi-directional communications in the forward and reverse links. Depending on the air interface used by the system of BS 101, the channel elements engage in time division multiple access (TDMA), frequency division multiple access (FDMA), or code division multiple access (CDMA) communications with the mobile stations in cell 121.

Transceiver IF 245 transfers the bi-directional channel signals between channel controller 235 and RF transceiver 250. Transceiver IF 245 converts the radio frequency signal from RF transceiver 250 to an intermediate frequency (IF). Channel controller 235 then converts this intermediate frequency (IF) to baseband frequency. Additionally, RF transceiver 250 may contain an antenna selection unit to select among different antennas in antenna array 255 during both transmit and receive operations.

Antenna array 255 is comprised of a number of directional antennas that transmit forward link signals, received from RF transceiver 250, to mobile stations in the sectors covered by BS 101. Antenna array 255 also receives reverse link signals from the mobile stations and sends the signals to RF transceiver 250. In a preferred embodiment of the present invention, antenna array 255 is a multi-sector antenna, such as a six-sector antenna, in which each antenna is responsible for transmitting and receiving in a sixty degree (60°) arc of coverage area.

BS 101 of the present invention is not limited to the architecture described above. The architecture may be different depending on the type of air interface standard used by the wireless system. Additionally, the present invention is not limited by the frequencies used. Different air interface standards require different frequencies.

In an advantageous embodiment of the present invention, BTS controller 225 comprises a microprocessor (also known as a microcontroller) and a memory unit. The microprocessor and memory unit of BTS controller 225 are not shown in FIG. 2. BTS controller 225 is capable of executing software applications stored in the memory unit. BTS controller 225 also comprises an A3/A7 message controller 270 and a rescue channel controller 280. As will be more fully described, A3/A7 message controller 270 and rescue channel controller 280 are capable of carrying out the present invention.

Figure 3:
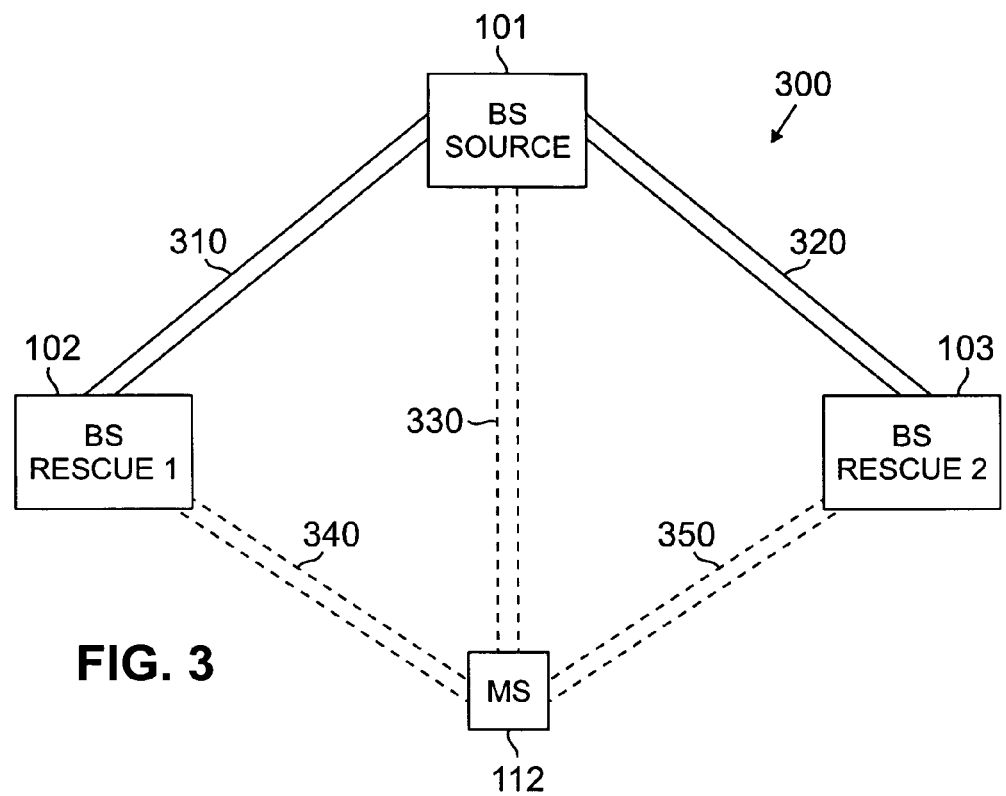
FIG. 3 illustrates an exemplary rescue of a wireless mobile station according to an advantageous embodiment of the present invention.

FIG. 3 illustrates an exemplary rescue 300 of wireless mobile station 112 according to an advantageous embodiment of the present invention. As shown in FIG. 1, mobile station 112 is motion away from base station 101. Base station 101 is a source base station in communication with mobile station 112. Base station 102 is a first neighbor base station that is capable of providing a rescue channel to mobile station 112. Base station 103 is a second neighbor base station that is capable of providing a rescue channel to mobile station 112. The exemplary configuration shown in FIG. 3 comprises mobile station 112, source base station 101 ("Source"), rescue base station 102 ("Rescue 1") and rescue base station 103 ("Rescue 2"). Link 310 between base station 101 and base station 102 comprises an A3 link as described in the IS-2000 standard. Link 320 between base station 101 and base station 103 is also an A3 link. The A3 links are shown with solid lines.

Mobile station 112 is in communication with base station 101 through air link 330. Mobile station 112 may also communicate with base station 102 through air link 340 and with base station 103 through air link 350. The air links are shown with dotted lines. Mobile station 112 is receiving signaling messages from base station 101, base station 102, and base station 103 on a Dedicated Control Channel (DCCH).

Assume that mobile station 112 is communicating with base station 101 on an active call. During the active call mobile station 112 sends a Pilot Strength Measurement Message (PSMM) to base station 101. The PSMM indicates to base station 101 the identity of the neighbor base stations, BS 102 and BS 103, that are near mobile station 112. Mobile station 112 keeps a neighbor list that identifies the neighbor base stations, BS 101 and BS 103.

Assume that base station 103 is capable of providing a rescue channel for mobile station 112. Base station 101 notifies mobile station 112 that base station 103 is capable of providing a rescue channel by sending to mobile station 112 an extended neighbor list update message. The extended neighbor list update message sends to mobile station 112 (1) the rescue channel Walsh codes for base station 103, and (2) the Quasi-Orthogonal function for base station 103. These codes are specially reserved codes on neighbor base station 103. These codes are used only in case a rescue is attempted. In this manner a rescue channel is reserved on base station 103 for the use of mobile station 112.

Figure 4:
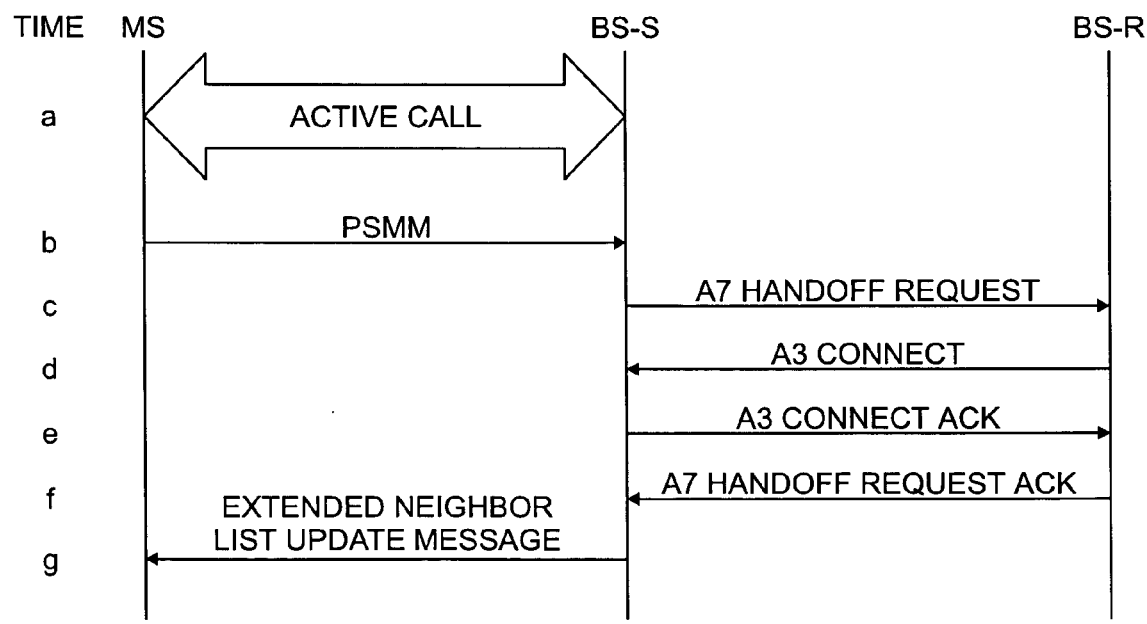
FIG. 4 illustrates a chart of call flows setting up a rescue channel to be used by a mobile station.

FIG. 4 illustrates a chart of call flows showing how a rescue channel may be set up on a neighbor base station to be used by a mobile station. The letters "MS" stand for the mobile station (mobile station 112 in this example). The letters "BS-S" stand for the source base station (base station 101 in this example) and the letters "BS-R" stand for the rescue base station (base station 103 in this example).

At time "a" an active call is in progress between mobile station 112 (MS) and the source base station 101 (BS-S). At time "b" mobile station 112 sends a Pilot Strength Measurement Message (PSMM) to source base station 101 indicating that rescue base station 103 (BS-R) is a neighbor. At time "c" source base station 101 realizes that rescue base station 103 is capable of providing a rescue channel for mobile station 112. Source base station 101 then sends to rescue base station 103 an A7 handoff request message to establish a rescue channel for mobile station 112. In one advantageous embodiment of the present invention, the A7 handoff request message of the present invention comprises an A7 handoff request message of the CDMA 2000 Air Interface Standard that has been modified to include a rescue channel indicator in accordance with the principles of the present invention. FIG. 6 illustrates an exemplary bitmap layout for an A7 handoff request message of the present invention. As shown in FIG. 6, the rescue channel indicator is set by placing a hexadecimal value four (4H) in bits zero (0) through three (3) for Physical Channel 1 in Octet 8.

At time "d" rescue base station 103 sends an A3 connect message to source base station 101 to establish an A3 connection for a rescue call. In one advantageous embodiment of the present invention, the A3 connect message of the present invention comprises an A3 connect message of the CDMA 2000 Air Interface is Standard that has been modified to include a rescue channel indicator in accordance with the principles of the present invention.

FIG. 10 illustrates a chart of physical channel types including the rescue channel of the present invention. Each physical channel is identified with a hexadecimal number "n". A maximum of one physical channel of each type is allowed per call association.

FIG. 7 illustrates an exemplary bitmap layout for an A3 connect message of the present invention. As shown in FIG. 7, the rescue channel indicator is set by placing a hexadecimal value five (5H) in bits one (1) through four (4) for Physical Channel Type in Octet 3. Rescue base station 103 provides source base station 101 with information concerning the Code CH and the QoF for the rescue channel.

At time "e" source base station 101 sends an A3 connect acknowledgment message to rescue base station 103 acknowledging the receipt of the A3 connect message from rescue base station 103. At time "f" rescue base station 103 sends an A7 handoff request acknowledgment message to source base station 101 to acknowledge receipt of the A7 handoff request message sent by source base station 101. If rescue base station 103 does not have a rescue channel capability, then rescue base station 103 sends a cause value that indicates "No Radio Resource Available."

At time "g" source base station 101 sends an extended neighbor list update message to mobile station 112. The extended neighbor list update message provides mobile station 112 with (1) the rescue channel Walsh codes for rescue base station 103, and (2) the Quasi-Orthogonal function for rescue base station 103. Mobile station 112 is now aware that rescue base station 103 has a rescue channel that may be used if mobile station 112 loses its current traffic channel. The active call between mobile station 112 and source base station 101 continues normally until there is a disruption in the traffic channel.

The calls described above and illustrated in FIG. 4 are handled in BTS controller 225 of source base station 101 in A3/A7 message controller 270 and in rescue channel controller 280. A3/A7 message controller 270 prepares A3 messages and A7 messages to be transmitted by source base station 101. A3/A7 message controller 270 also interprets incoming A3 messages and A7 messages from mobile station 112 and rescue base station 103. Rescue channel controller 280 coordinates the establishment of a rescue channel for mobile station 112 with rescue base station 103. The BTS controller (not shown) of rescue base station 103 also comprises a is similar A3/A7 message controller (not shown) and a similar rescue channel controller (not shown).

Figure 5:
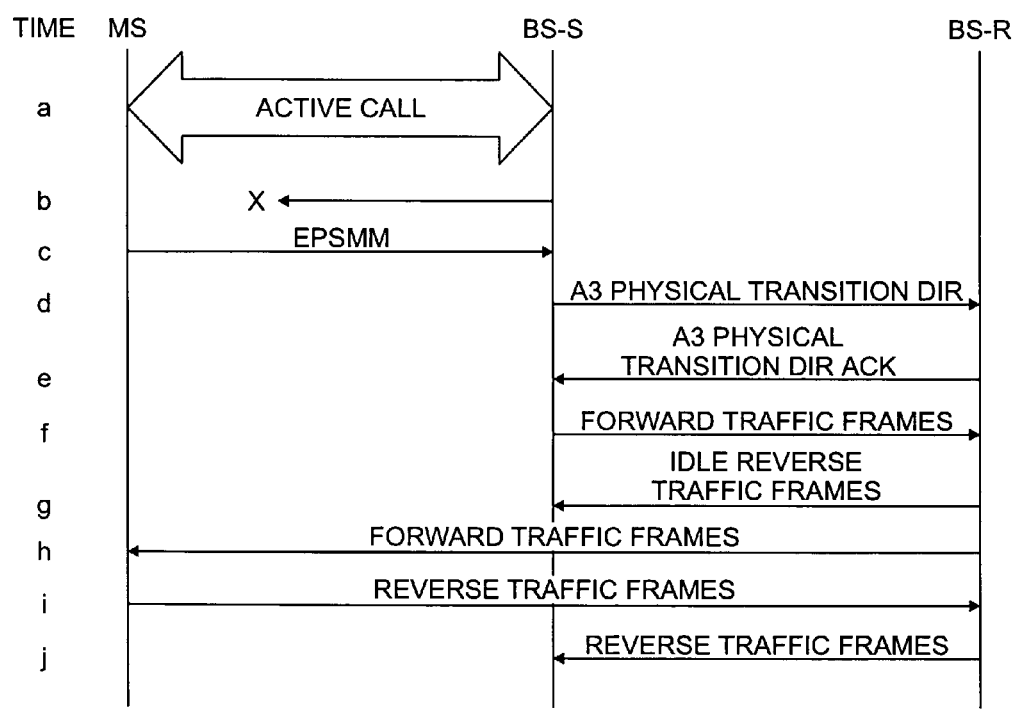
FIG. 5 illustrates a chart of call flows activating a rescue channel to rescue a mobile station.

Now assume that mobile station 112 experiences a disruption in its traffic channel. FIG. 5 illustrates a chart of call flows showing how a previously established rescue channel may be activated to rescue mobile station 112. At time "a" an active call is in progress between mobile station 112 (MS) and source base station 101 (BS-S) . At time "b" the mobile station traffic is disrupted and mobile station 112 loses two or more frames from source base station 101. Mobile station 112 then shuts down its transmitter and waits for the communication conditions to improve. At time "c" after the communication conditions have improved, mobile station 112 sends an Extended Pilot Strength Measurement Message (Extended PSMM) to source base station 101 indicating that rescue base station 103 (BS-R) has been promoted to the active set. Mobile station 112 then begins monitoring the rescue channel from rescue base station 103 in addition to monitoring other active cells.

At time "d" source base station 101 sends an A3 physical transition directive message to rescue base station 103 to indicate that a rescue attempt is in progress. In one advantageous embodiment of the present invention, the A3 physical transition directive message of the present invention comprises an A3 physical transition directive message of the CDMA 2000 Air Interface Standard that has been modified to include a rescue channel indicator in accordance with the principles of the present invention. FIG. 9 illustrates an exemplary bitmap layout for a rescue channel indicator of the present invention to be added to a standard A3 physical transition directive message. As shown in FIG. 9, the rescue channel indicator is identified in bits zero (0) through seven (7) in Octet 1. The rescue channel indicator (RCI) is set by setting bit zero (0) (the RCI bit) equal to one (1) in Octet 2. Setting the RCI bit equal to one (1) means that a rescue attempt is in progress.

FIG. 8 illustrates a chart of information elements that may be sent using an A3 physical transition directive message. The rescue channel indicator (RCI) of the present invention is shown as the last entry in the chart. The information element for the rescue channel indicator (RCI) is included if source base station 101 is requesting rescue base station 103 to activate the rescue channel associated with A3 connection 320.

At time "e" rescue base station 103 sends an A3 physical transition directive acknowledgment message to source base station 101 to confirm that the rescue attempt is in progress. If rescue is base station 103 in not capable of providing a rescue channel then rescue base station 103 will include a cause value ("OAH") in the message to indicate that there is "No Radio Resource Available." At time "f" source base station 101 begins sending forward traffic frames to rescue base station 103 over A3 connection 320 for the rescue channel. At time "g" rescue base station 103 begins sending idle reverse traffic frames to source base station 101 over A3 connection 320 for the rescue channel.

At time "h" rescue base station 103 begins sending the forward traffic frames over the rescue channel on air link 350 to mobile station 112. Rescue base station 103 also begins listening for mobile station 112 on the forward channel of mobile station 112. Information concerning mobile station 112 was previously made available to rescue base station 103 in the A7 handoff request message (at time "c" in FIG. 4) when the rescue channel was first set up.

At time "i" rescue base station 103 acquires mobile station 112 and receives reverse traffic frames from mobile station 112. At time "j" rescue base station 103 sends the reverse traffic frames from mobile station 112 to source base station 101. In this manner traffic between source base station 101 and mobile station 112 is routed through rescue base station 103 on the rescue channel.

After mobile station 112 has been rescued as described above, source base station 101 may decide to add rescue base station 103 as a new soft handoff leg. Usual procedures for adding rescue base station 103 as a new leg may are followed (e.g., changing the Walsh code to remove mobile station 112 from the rescue channel).

In the advantageous embodiment of the present invention described above, existing Internetwork Operating System (IOS) messages were modified to support rescue channel communications between base stations. In an alternate advantageous embodiment of the present invention, a new A3 rescue channel activation message is created and a new A3 rescue channel activation acknowledgment message is created to support rescue channel communications between base stations. In the alternate advantageous embodiment of the present invention, the A7 handoff request messages and the A3 connect messages are modified in the same manner as previously described.

The new A3 rescue channel activation message is sent from source base station 101 to rescue base station 103 over A3 connection 320 to cause rescue base station 103 to activate a previously assigned rescue channel. The new A3 rescue channel activation message is sent instead of the modified A3 physical transition directive message that was previously described in connection with the first advantageous embodiment of the present invention. For example, the new A3 rescue channel activation message is sent from source base station 101 to rescue base station 103 at time "d" in FIG. 5 instead of the modified A3 physical transition directive message.

FIG. 11 illustrates a chart of information elements that may be sent using the new A3 rescue channel activation message. The third line of the chart shows the rescue channel indicator of the present invention. The fourth line of the chart shows an information element called A3 Destination ID. If an A3 Originating ID field was included in the corresponding A3 connect information element of an A3 connect message that established the traffic connection, then the A3 Destination ID information element contains this information and is included in the new A3 rescue channel activation message.

FIG. 12 illustrates an exemplary bitmap layout of the new A3 rescue channel activation message of the present invention. Bits zero (0) through seven (7) of Octet 1 of the Message Type field contain a hexadecimal number that indicates the message type. Bits zero (0) through seven (7) of Octet 1 of the rescue channel indicator field contain a hexadecimal number that contains the A3/A7 Element Identifier. The rescue channel indicator bit is bit zero (0) of Octet 2 of the rescue channel indicator field. Bits zero (0) through seven (7) of Octet 1 of the A3 Destination ID field contains the A3/A7 Element Identifier.

The new A3 rescue channel activation acknowledgment message is sent from rescue base station 103 to source base station 101 over A3 connection 320 to report the outcome of processing of a new A3 rescue channel activation message. The new A3 rescue channel activation acknowledgment message is sent instead of the A3 physical transition directive acknowledgment message that was previously described in connection with the first advantageous embodiment of the present invention. For example, the new A3 rescue channel activation acknowledgment message is sent from rescue base station 103 to source base station 101 at time "e" in FIG. 5 instead of the A3 physical transition directive acknowledgment message.

FIG. 13 illustrates a chart of information elements that may be sent using the new A3 rescue channel activation acknowledgment message. The third line of the chart shows an information element called Packet Mode Channel (PMC) Cause. An allowable PMC cause value is a value that indicates that there is "No Radio Resource Available." This indication means that rescue base station 103 does not have a rescue channel capability.

The fourth line of the chart shows an information element called A3 Destination ID. If the A3 Originating ID field was included in the corresponding A3 connect acknowledgment information element of an A3 connect acknowledgment message that established the traffic connection for these cells, then the A3 Destination ID information element will contain this information and be included in the A3 rescue channel activation acknowledgment message. Each instance of the A3 Destination ID information element corresponds to one cell in a Cell Information Record.

The fifth line of the chart shows an information element called A7 Destination ID. If the A7 Originating ID information element was included in the corresponding A7 handoff request message and the A3 flag field was set to one (1) then the A7 Destination ID information element is included in the A3 rescue channel activation acknowledgment message and contains the value of the A7 Originating ID.

FIG. 14 illustrates an exemplary bitmap layout of an A3 rescue channel activation acknowledgment message of the present invention. Bits zero (0) through seven (7) of Octet 1 of the Message Type field contain a hexadecimal number that indicates the message type. Bits zero (0) through seven (7) of Octet 1 of the PMC Cause field contain a hexadecimal number [05H] in the A3/A7 Element Identifier field. Bits zero (0) through seven (7) of Octet 3 of the PMC Cause field contain a hexadecimal number [0AH] as a value of the PMC Cause that indicates that "No Radio Resource Available." Bits zero (0) through seven (7) of Octet 1 of the A3 Destination ID field contain a hexadecimal number [55H] for the A3/A7 Element Identifier for the A3 Destination ID. Octets three (3) through k of the A3 Destination ID contain the value of the A3 Destination ID. Bits zero (0) through seven (7) of Octet 1 of the A7 Destination ID field contain a hexadecimal number [2DH] for the A3/A7 Element Identifier for the A7 Destination ID. Octets three (3) through k of the A7 Destination ID contain the value of the A7 Destination ID.

The calls described above and illustrated in FIG. 5 are handled in BTS controller 225 of source base station 101 in A3/A7 message controller 270 and in rescue channel controller 280. As previously described, A3/A7 message controller 270 prepares A3 messages and A7 messages to be transmitted by source base station 101. A3/A7 message controller 270 also interprets incoming A3 messages and A7 messages from mobile station 112 and rescue base station 103. Rescue channel controller 280 coordinates the establishment of a rescue channel for mobile station 112 with rescue base station 103. The BTS controller (not shown) of rescue base station 103 also comprises a similar A3/A7 message controller (not shown) and a similar rescue channel controller (not shown).

Figure 15:
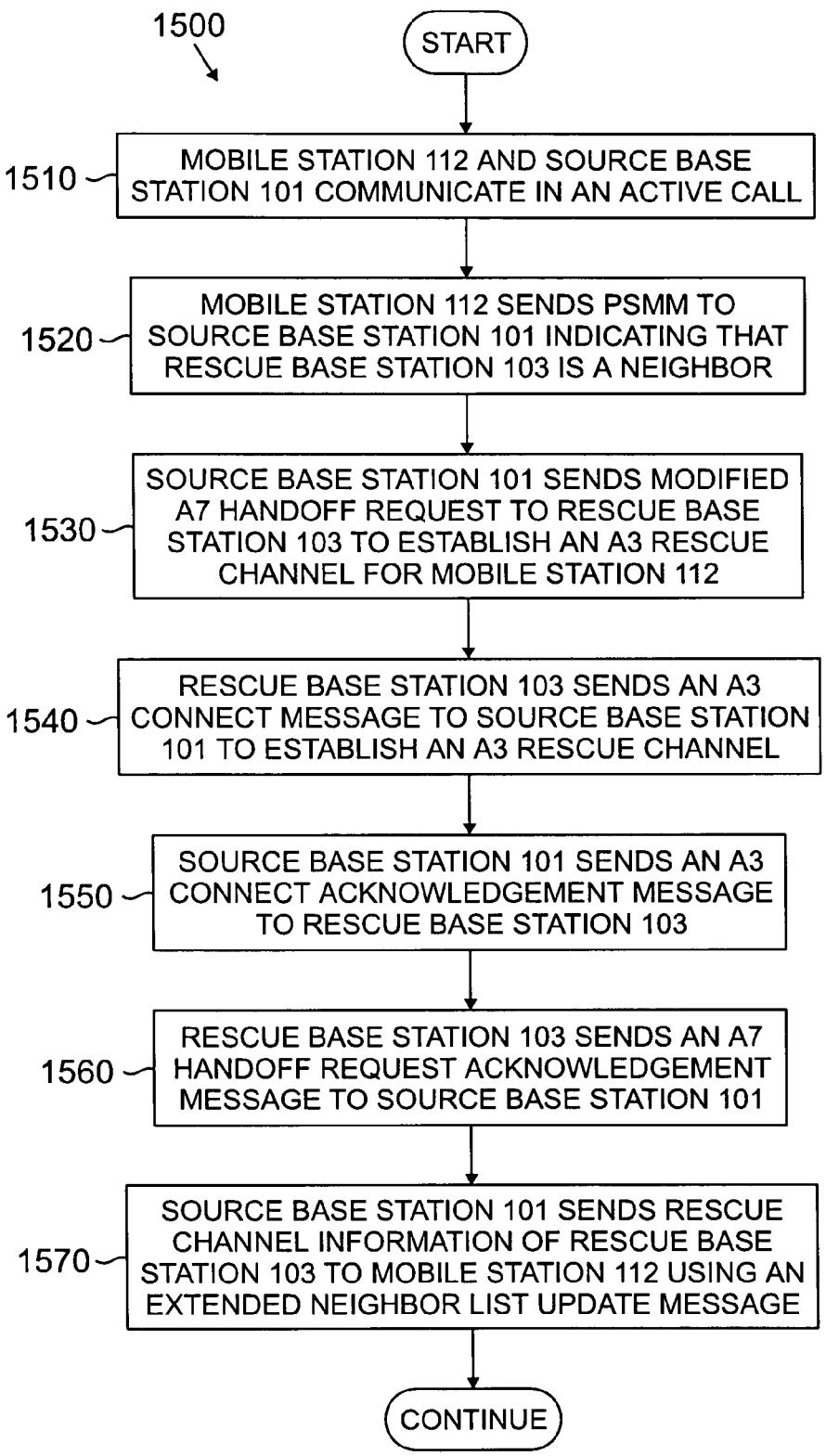
FIG. 15 illustrates a flow chart showing the steps of an advantageous embodiment of a method of the present invention for establishing rescue channel communications between two base stations in a wireless communication system.

FIG. 15 illustrates a flow chart 1500 showing the steps of an advantageous embodiment of a method of the present invention for setting up rescue channel communications between two base stations in a wireless communications network. Mobile station 112 communicates with source base station 101 during an active call (step 1510). Mobile station 112 sends a Pilot Strength Measurement Message (PSMM) to source base station 101 indicating that rescue base station 103 is a neighbor of mobile station 112 (step 1520). Source base station 101 sends a modified A7 handoff request message to rescue base station 103 to establish an A3 rescue channel for mobile station 112 (step 1530). As previously described, the modified A7 handoff request message is a standard A7 handoff request message modified to include a rescue channel indicator.

Rescue base station 103 then sends an A3 connect message to source base station 101 establishing a rescue channel for mobile station 112 (step 1540). Source base station 101 then sends an A3 connect acknowledgment message to rescue base station 103 (step 1550). Rescue base station 103 then sends an A7 handoff request acknowledgment message to source base station 101. If rescue base station 103 does not have a rescue channel capability, rescue base station 103 sends a cause value that indicates "No Radio Resource Available" (Step 1560). Source base station 101 then sends the rescue channel information of rescue base station 103 to mobile station 112 using an extended neighbor list update message (step 1570). Mobile station 112 is now aware that rescue base station 103 has a rescue channel that may be used if mobile station 112 loses its current traffic channel.

Figure 16:
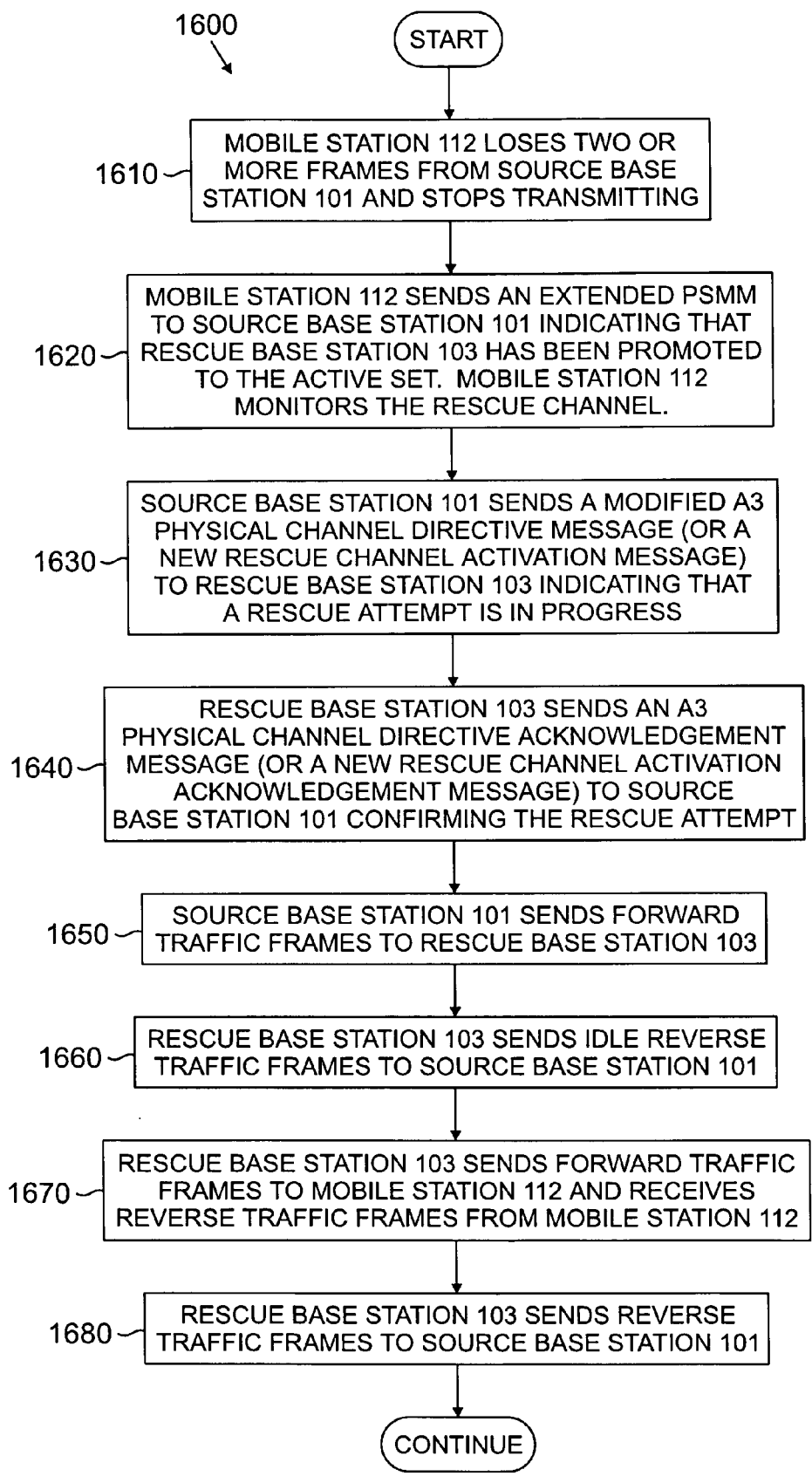
FIG. 16 illustrates a flow chart showing the steps of an advantageous embodiment of a method of the present invention for activating rescue channel communications between two base stations in a wireless communication system.

FIG. 16 illustrates a flow chart 1600 showing the steps of an advantageous embodiment of a method of the present invention for activating rescue channel communications between two base stations in a wireless communication system. A rescue channel has previously been set up using the method described above. Mobile station 112 communicates with source base station 101 during an active call until mobile station 112 loses two or more frames from source base station 101 and stops transmitting (step 1610). After communication conditions have improved, mobile station 112 sends an Extended Pilot Strength Measurement Message (Extended PSMM) to source base station 101 indicating that rescue base station 103 has been promoted to the active set. Mobile station 112 begins monitoring the rescue channel from rescue base station 103 (step 1620).

Source base station 101 then sends a modified A3 physical channel directive message (or, in the alternative, a new A3 rescue channel activation message) to rescue base station 103 indicating that a rescue attempt is in progress (step 1630). Rescue base station 103 then sends an A3 physical channel directive acknowledgment message (or, in the alternative, a new A3 rescue channel activation acknowledgment message) to source base station 101 confirming the rescue attempt (step 1640). Source base station 101 then sends forward traffic frames to rescue base station 103 over the A3 rescue channel (step 1650). Rescue base station then sends idle reverse traffic frames to source base station 101 over the A3 rescue channel (step 1660).

Rescue base station 103 then sends forward traffic frames to mobile station 112 and receives reverse traffic frames from mobile station 112 (step 1670). Rescue mobile station 103 then sends reverse traffic frames to source base station 101 (step 1680). In this manner traffic between source base station 101 and mobile station 112 is routed through rescue base station 103 on the A3 rescue channel.

Although the present invention has been described in detail, those skilled in the art should understand that they can make various changes, substitutions and alterations herein without departing from the spirit and scope of the invention in its broadest form.

What is claimed is:

1. For use in a wireless communication system comprising at least two base stations and a mobile station, an apparatus for providing rescue channel communications between said at least two base stations in said wireless communication system, said apparatus comprising:
   a rescue base station that is capable of communicating with said mobile station that is capable of providing a rescue channel for said mobile station; and
   a source base station that is capable of communicating with said mobile station and with said rescue base station and that is capable of sending messages to said rescue base station to establish a rescue channel from said source base station to said mobile station through said rescue base station,
   wherein said source base station is capable of sending an A7 handoff request message to said rescue base station to establish said rescue channel for said mobile station.

2. The apparatus as set forth in claim 1 wherein said A7 handoff request message comprises an A7 handoff request message of a CDMA 2000 Air Interface Standard that has been modified to include a rescue channel indicator.

3. The apparatus as set forth in claim 1 wherein, in response to receiving said A7 handoff request message from said source base station, said rescue base station is capable of sending an A3 connect message to said source base station to establish an A3 connection for said rescue channel.

4. The apparatus as set forth in claim 3 wherein said A3 connect message comprises an A3 connect message of a CDMA 2000 Air Interface Standard that has been modified to include a rescue channel indicator.

5. The apparatus as set forth in claim 3 wherein said source base station is capable of sending an A3 connect acknowledgment message to said rescue base station and said rescue base station is capable of sending an A7 handoff request acknowledgment message to said source base station.

6. The apparatus as set forth in claim 5 wherein said source base station is capable of sending rescue channel information to said mobile station using an extended neighbor list update message.

7. The apparatus as set forth in claim 6 wherein, in response to experiencing traffic disruption, said mobile station is capable of sending an extended pilot strength measurement message to said source base station to indicate that said rescue base station has been promoted to an active set of said mobile station.

8. The apparatus as claimed in claim 7 wherein said source base station sends an A3 physical transition directive message to said rescue base station indicating that a rescue attempt is in progress.

9. The apparatus as set forth in claim 8 wherein A3 physical transition directive message comprises an A3 physical transition directive message of a CDMA 2000 Air Interface Standard modified to include a rescue channel indicator.

10. The apparatus as claimed in claim 8 wherein, in response to receiving said A3 physical transition directive message, said rescue base station sends an A3 physical transition directive acknowledgment message to said source base station to confirm that said rescue attempt is in progress.

11. The apparatus as set forth in claim 10 wherein:
said source base station sends forward traffic frames to said rescue base station;
said rescue base station sends idle reverse traffic frames to said source base station;
said rescue base station sends forward traffic frames to said mobile station;
said rescue base station receives reverse traffic frames from said base station; and
said rescue base station sends reverse traffic frames to said source base station.

12. The apparatus as set forth in claim 7 wherein said source base station sends an A3 rescue channel activation message to said rescue base station indicating that a rescue attempt is in progress.

13. The apparatus as set forth in claim 12 wherein, in response to receiving said A3 rescue channel activation message, said rescue base station sends an A3 rescue channel activation acknowledgment message to said source base station to confirm that said rescue attempt is in progress.

14. The apparatus as set forth in claim 13 wherein:
said source base station sends forward traffic frames to said rescue base station;
said rescue base station sends idle reverse traffic frames to said source base station;
said rescue base station sends forward traffic frames to said mobile station;
said rescue base station receives reverse traffic frames from said base station; and
said rescue base station sends reverse traffic frames to said source base station.

15. For use in a wireless communication system comprising at least two base stations and a mobile station, a method for providing rescue channel communications between said at least two base stations in said wireless communication system, said method comprising the steps of:
providing a rescue base station that is capable of communicating with said mobile station and that is capable of providing a rescue channel for said mobile station; and
providing a source base station that is capable of communicating with said mobile station and with said rescue base station; and
sending messages from said source base station to said rescue base station to establish a rescue channel from said source base station to said mobile station through said rescue base station,
sending an A7 handoff request message from said source base station to said rescue base station to establish said rescue channel for said mobile station.

16. The method as set forth in claim 15 wherein said A7 handoff request message comprises an A7 handoff request message of a CDMA 2000 Air Interface Standard that has been modified to include a rescue channel indicator.

17. The method as set forth in claim 15 further comprising the step of:
in response to receiving said A7 handoff request message from said source base station, sending an A3 connect message from said rescue base station to said source base station to establish an A3 connection for said rescue channel.

18. The method as set forth in claim 17 wherein said A3 connect message comprises an A3 connect message of a CDMA 2000 Air Interface Standard that has been modified to include a rescue channel indicator.

19. The method as set forth in claim 17 further comprising the steps of:
sending an A3 connect acknowledgment message from said source base station to said rescue base station; and
sending an A7 handoff request acknowledgment message from said rescue base station to said source base station.

20. The method as set forth in claim 19 further comprising the step of:
sending rescue channel information from said source base station to said mobile station using an extended neighbor list update message.

21. The method as set forth in claim 20 further comprising the steps of:
experiencing traffic disruption in said mobile station;
promoting said rescue base station to an active set of said mobile station; and
sending from said mobile station to said source base station an extended pilot strength measurement message to indicate that said rescue base station has been promoted to an active set of said mobile station.

22. The method as claimed in claim 21 further comprising the steps of:
sending an A3 physical transition directive message from said source base station to said rescue base station indicating that a rescue attempt is in progress.

23. The method as set forth in claim 22 wherein said A3 physical transition directive message comprises an A3 physical transition directive message of a CDMA 2000 Air Interface Standard modified to include a rescue channel indicator.

24. The method as claimed in claim 22 further comprising the steps of:

receiving said A3 physical transition directive message in said rescue base station;

sending an A3 physical transition directive acknowledgment message from said rescue base station to said source base station to confirm that said rescue attempt is in progress.

25. The method as set forth in claim 24 further comprising the steps of:

sending forward traffic frames from said source base station to said rescue base station;

sending idle reverse traffic frames from said rescue base station to said source base station;

sending forward traffic frames from said rescue base station to said mobile station;

receiving in said rescue base station reverse traffic frames from said base station; and sending reverse traffic frames from said rescue base station to said source base station.

26. The method as set forth in claim 21 further comprising in the step of:

sending an A3 rescue channel activation message from said source base station to said rescue base station indicating that a rescue attempt is in progress.

27. The method as set forth in claim 26 further comprising the steps of:

receiving said A3 rescue channel activation message in said rescue base station; and sending an A3 rescue channel activation acknowledgment message from said base station to said source base station to confirm that said rescue attempt is in progress.

28. The method as set forth in claim 27 further comprising the steps of:

sending forward traffic frames from said source base station to said rescue base station;

sending idle reverse traffic frames from said rescue base station to said source base station;

sending forward traffic frames from said rescue base station to said mobile station;

receiving in said rescue base station reverse traffic frames from said base station; and sending reverse traffic frames from said rescue base station to said source base station.

* * * * *

UNITED STATES PATENT AND TRADEMARK OFFICE
CERTIFICATE OF CORRECTION

| | | |
|---|---|---|
| PATENT NO. | : 7,047,010 B2 | Page 1 of 1 |
| APPLICATION NO. | : 10/028390 | |
| DATED | : May 16, 2006 | |
| INVENTOR(S) | : William Joseph Semper | |

It is certified that error appears in the above-identified patent and that said Letters Patent is hereby corrected as shown below:

Column 3, line 50, delete "is" before the term "used";

Column 9, line 63, delete "is" after the term "Interface".

Signed and Sealed this

Twentieth Day of February, 2007

JON W. DUDAS
*Director of the United States Patent and Trademark Office*